United States Patent
Nammi et al.

(10) Patent No.: US 10,057,011 B2
(45) Date of Patent: Aug. 21, 2018

(54) RECEIVER FOR DETECTING AND DECODING SIGNALS

(71) Applicant: TELEFONAKTIEBOLAGET LM ERICSSON (PUBL), Stockholm (SE)

(72) Inventors: SaiRamesh Nammi, Austin, TX (US); Cagatay Konuskan, Oslo (NO); Namir Lidian, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/329,714

(22) PCT Filed: Jul. 30, 2014

(86) PCT No.: PCT/IB2014/063558
§ 371 (c)(1),
(2) Date: Jan. 27, 2017

(87) PCT Pub. No.: WO2016/016687
PCT Pub. Date: Feb. 4, 2016

(65) Prior Publication Data
US 2017/0222756 A1  Aug. 3, 2017

(51) Int. Cl.
*H04L 1/00* (2006.01)
(52) U.S. Cl.
CPC .......... *H04L 1/0054* (2013.01); *H04L 1/0072* (2013.01)

(58) Field of Classification Search
USPC ........................................ 370/277, 329, 252
See application file for complete search history.

(56) References Cited

U.S. PATENT DOCUMENTS

| | | | |
|---|---|---|---|
| 2013/0117622 A1 | 5/2013 | Blankenship et al. | |
| 2015/0078187 A1* | 3/2015 | Ben-Eli | H04B 1/7097 370/252 |
| 2015/0312015 A1* | 10/2015 | Chen | H04L 1/0026 370/329 |
| 2016/0380744 A1* | 12/2016 | Aryafar | H04L 5/14 370/277 |
| 2017/0164360 A1* | 6/2017 | Kim | H04W 72/0446 |
| 2017/0257156 A1* | 9/2017 | Ko | H04L 1/0026 |

OTHER PUBLICATIONS

3GPP, "3rd Generation Partnership Project; Technical Specification Group Radio Access Network; Multiplexing and channel coding (FDD) (Release 7)," 3GPP TS 25.212 V7.0.0, Mar. 2006.

(Continued)

*Primary Examiner* — Eva Puente
(74) *Attorney, Agent, or Firm* — Patent Portfolio Builders PLLC

(57) ABSTRACT

Method and receiver jointly detect and decode a part of an encoded, spread and modulated signal received on a channel in a wireless communication network and corrupted by channel multipath. Differences between the received signal and noiseless theoretical signals corresponding to each of the possible values of the part are calculated using hypothetical transmission matrices. The smallest difference corresponds to the actual value of the part.

15 Claims, 7 Drawing Sheets

(56) References Cited

OTHER PUBLICATIONS

3GPP, "3rd Generation Partnership Project; Technical Specification Group Radio Access Network; Multiplexing and channel coding (FDD) (Release 11)," 3GPP TS 25.212 V11.4.0, Dec. 2012.
3GPP, "3rd Generation Partnership Project; Technical Specification Group Radio Access Network; Physical layer procedures (FDD) (Release 11)," 3GPP TS 25.214 V11.4.0, Dec. 2012.
3GPP, "3rd Generation Partnership Project; Technical Specification Group Radio Access Network; Physical layer procedures (FDD) (Release 11)," 3GPP TS 25.214 V11.8.0, Mar. 2014.
Benvenuto et al., "Algorithms for Communications Systems and their Applications," Oct. 11, 2002, John Wiley & Sons Ltd.
International Search Report and Written Opinion dated Apr. 1, 2015 in related International Application No. PCT/IB2014/063558.
Proakis et al., "Chapter 5: Optimum Receivers for the Additive White Gaussian Noise Channel," Digital Communications, 5th Edition, Nov. 6, 2007, McGraw-Hill Higher Education.
3GPP; "3rd Generation Partnership Project; Technical Specification Group Radio Access Network; Multiplexing and channel coding (FDD) (Release 11)"; 3GPP TS 25.212 V11.7.0 (Mar. 2014) Technical Specification; Mar. 2014; pp. 1-162; Valbonne, France.
3GPP; "3rd Generation Partnership Project; Technical Specification Group Radio Access Network; Physical layer procedures (FDD) (Release 11)"; 3GPP TS 25.214 V11.9.0 (Jun. 2014) Technical Specification; Jun. 2014; pp. 1-128; Valbonne, France.

* cited by examiner

RECEIVER FOR DETECTING AND DECODING SIGNALS

TECHNICAL FIELD

The present invention generally relates to methods and receivers in wireless networks, and, more particularly, to techniques for jointly detecting and decoding signals.

BACKGROUND

As personal devices (smartphones, laptops, tablets, etc.) become more popular and frequently used, the need to efficiently provide services via wireless networks continually increases. Rules regarding communication channels and the structure of messages exchanged between personal devices and wireless networks are agreed upon in international technical groups, such as the 3$^{rd}$ Generation Partnership Project (3GPP). These rules are necessary to enable devices produced by various manufacturers to connect to networks.

FIG. 1 illustrates an example of messages exchanged according to 3GPP rules in a wireless system (e.g., a 3GPP High Speed Packet Access system) for setting up a data communication session. A first network device (Node B) 110 sends pilot signals on common pilot channels to a second network device, user equipment (UE) 120. UE 120 estimates channel quality (e.g., signal-to-noise ratio) based on the received pilot signals, deriving channel quality information (CQI). CQI together with another piece of information, HARQ ACK/NAK (indicating whether a previous data packet has been received), are reported to Node B using a dedicated physical control channel (HS-DPCCH), also called the uplink control channel. Upon receiving the control message and extracting CQI, Node B 110 allocates channelization codes, modulation, coding, etc., to UE 120 for the data communication session there-between. Node B 110 conveys this allocation information to UE 120 via a shared control channel (HS-SCCH), also called the downlink control channel. Once UE 120 detects the message transmitted via HS-SCCH, downlink data transmission from Node B 110 to UE 120 starts through the Physical Downlink Shared Channel (HS-PDSCH).

As illustrated in FIG. 2, a reporting (control) message 200 sent by UE 120 to Node B 110 via the uplink control channel HS-DPCCH consists of one slot for HARQ-ACK and two slots for CQI, as illustrated in FIG. 2. When the UE is configured in non-MIMO (Multiple Input Multiple Output) mode with a single carrier, HARQ-ACK's one bit is coded into 10 bits to be transmitted in a first slot, and CQI's 5 bits are coded into 20 bits to be transmitted to Node B in the following two slots. Messages reporting HARQ-ACK and channel quality information are sent not only when the data communication session is set up, but also periodically during the session.

A block diagram of a transmitter 300 (e.g., located in UE 120) is illustrated in FIG. 3. In block 310, HARQ-ACK's bit is coded into 10 bits using a pre-defined codebook, such as the one set forth in 3GPP TS 25.212, version 11.7.0. In block 320, CQI's 5 bits (derived from the signal-to-noise ratio quantized using a lookup table) are coded into 20 bits using a block code such as described in 3GPP TS 25.214, version 11.9.0.

Then, in block 330, coded HARQ-ACK's 10 bits and coded CQI's 20 bits are combined, modulated, spread with a spreading factor of 256 and scrambled with a cell-specific scrambling code to generate 7680 (=256×30) chips. The 7680 chips are transmitted to Node B in a single Time Transmission Interval (TTI).

A block diagram of a conventional receiver 400 (e.g., located in Node B 110) is illustrated in FIG. 4. In block 410, the signal received via one or more antenna(s) is descrambled, de-spread and demodulated. Block 410 includes a Minimum-Mean-Square-Error (MMSE) detector, a "rake" (or "grake") equalizer configured to diminish multipath fading, a descrambler, a de-spreader and a demodulator. Note that the signal may be equalized after it is descrambled and de-spread. The HARQ-ACK and the CQI portions of the signal are then decoded separately in blocks 420 and 430, respectively, to retrieve the one bit of ACK/NAK and CQI's 5 bits.

The conventional receiver has the disadvantage that the signal blocks are processed individually, which is known from signal detection theory to be inefficient, resulting in a suboptimal block error rate (BLER). Since such reporting messages are often exchanged between mobile devices and network devices, it is desirable the carried information be retrieved optimally in receivers, with the fewest possible errors and repetitions.

SUMMARY

An objective of various embodiments is to overcome the deficiencies of conventional receivers discussed in the previous section (e.g., a suboptimal BLER) and to provide methods and receivers that recover information carried by multipart, encoded, scrambled and modulated signals with enhanced accuracy. One or more of the embodiments discussed herein advantageously achieves this objective by jointly detecting and decoding one or more parts of the signal using the maximum likelihood principle.

According to one embodiment, there is a method for jointly detecting and decoding at least a part of a signal, which is transmitted using multipath in a wireless communication network and is corrupted by channel multipath. The method includes receiving the signal altered by noise at a network device, generating transmission matrices and calculating differences between the signal altered by noise and noiseless signals that are obtained using the transmission matrices and correspond to possible values of the part, respectively. The method further includes outputting a value corresponding to the smallest among the calculated differences as the part of the signal.

According to another embodiment, there is a network device in a wireless communication network. The network device has a receiver for jointly detecting and decoding at least a part of a signal transmitted using multipath. The receiver includes a first module configured to receive a noise-altered signal, a second module configured to generate transmission matrices corresponding to possible values of the part of the signal, and a third module configured to calculate, differences between the noise-altered signal and noiseless signals. The noiseless signals are obtained using the transmission matrices and correspond to the possible values of the part of the signal, respectively. The receiver also includes a fourth module configured to output the value which corresponds to the smallest among the calculated differences as the part of the signal.

According to another embodiment, there is a computer readable medium that stores computer-executable instructions, which, when executed by a computer, implement a method for jointly detecting and decoding at least a part of a signal transmitted using multipath in a wireless communication network. The method includes receiving the signal altered by noise at a network device, generating transmission matrices, each of which corresponds to one possible value of the part of the signal. The method further includes calculating differences between the signal altered by noise and noiseless signals that are obtained using the transmission matrices and correspond to the possible values of the part, respectively. The method further includes outputting a value corresponding to the smallest among the calculated differences as the part of the signal.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a wireless network capable of multipath communication. Although the following description refers to 3GPP High Speed Packet Access (HSPA) systems as described in 3GPP specifications, the described concepts are pertinent to other wireless systems, including LTE, LTE-A, WiMax, UMB, GSM, 5G, etc.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments or claims.

According to an embodiment, there is a method for jointly detecting and decoding at least a part of a signal transmitted using multipath in a wireless communication network. The signal that was generated from at least two parts coded, spread, scrambled and multiplexed is received altered by noise. At least part of the signal is retrieved by jointly detecting and decoding the signal using the maximum likelihood principle. Specifically, the smallest among differences between the received signal and theoretical noiseless signals simulated for each of the possible values of the part respectively is considered to correspond to the actual value. The signal may be a control signal transmitted on an uplink or downlink control channel.

Figure 5:
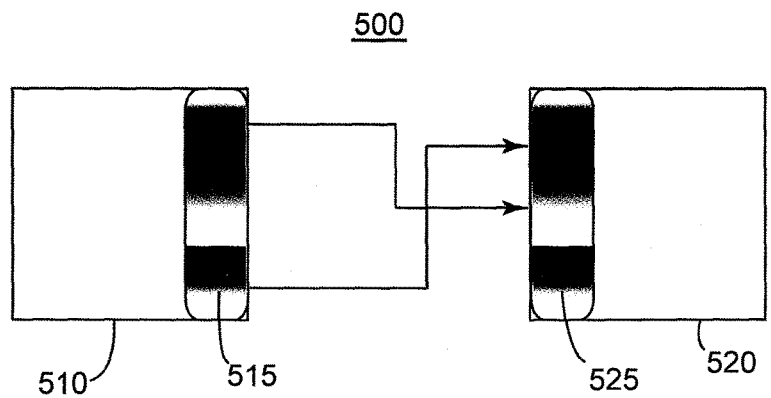
FIG. 5 illustrates devices in a wireless network, one of the devices including a receiver according to an embodiment.

According to an embodiment illustrated in FIG. 5, in a wireless communication system 500, a first network device 510 includes a transmitter 515 that generates and emits a signal resulting from encoding, modulating, spreading and scrambling at least two pieces of information. A second network device 520 in wireless communication system 500 receives the signal as altered by noise (e.g., Gaussian noise). Second network device 520 includes a receiver 525 according to an embodiment configured to jointly detect and decode at least one part of the signal, which is transmitted via multipath. The signal may be a control signal including a HARQ-ACK part and a CQI part. The first device may be user equipment, and the second device may be a base station or vice-versa (i.e., the first device a base station and the second device user equipment).

Figure 1:
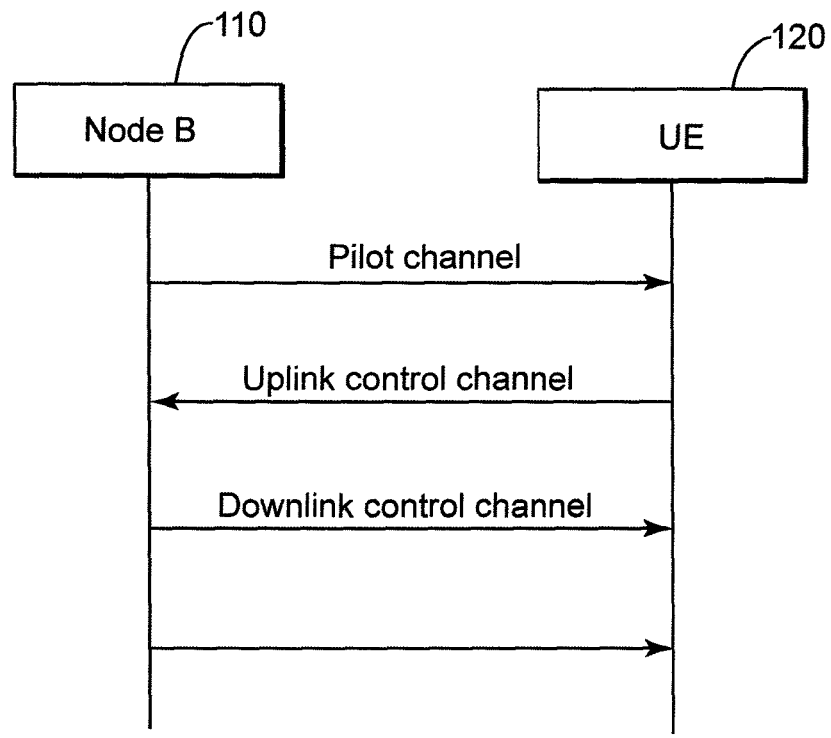
FIG. 1 illustrates the messages exchanged for setting up a data communication session.
Figure 2:
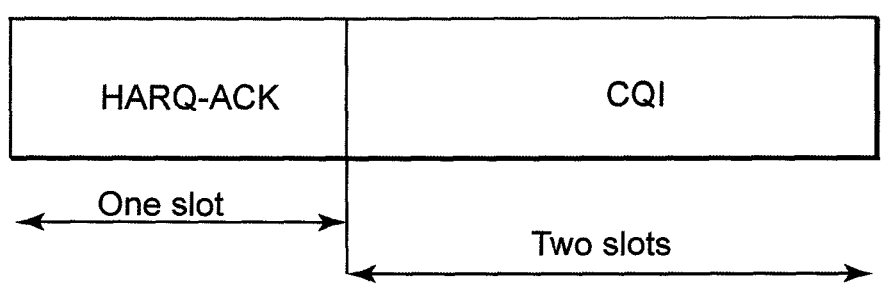
FIG. 2 illustrates the structure of a control message.
Figure 3:
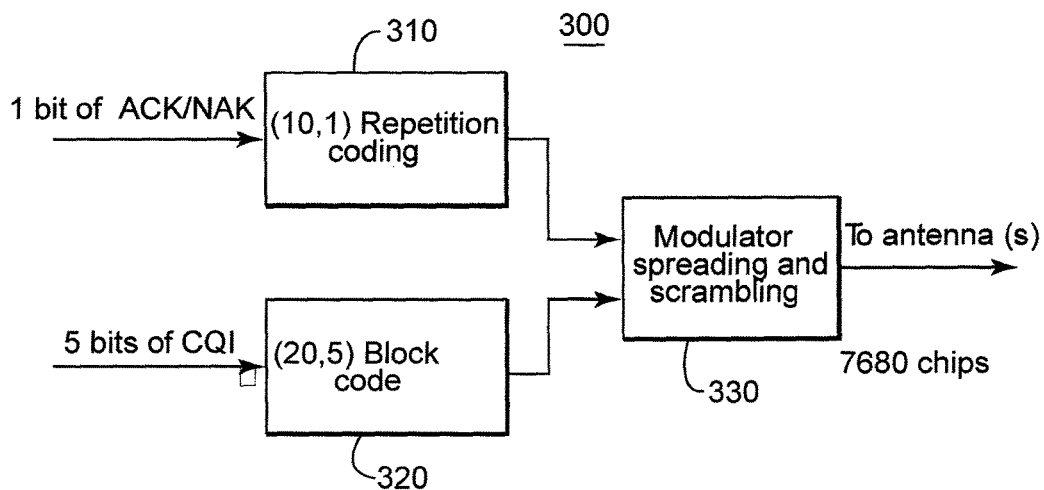
FIG. 3 is a block diagram of a transmitter.
Figure 4:
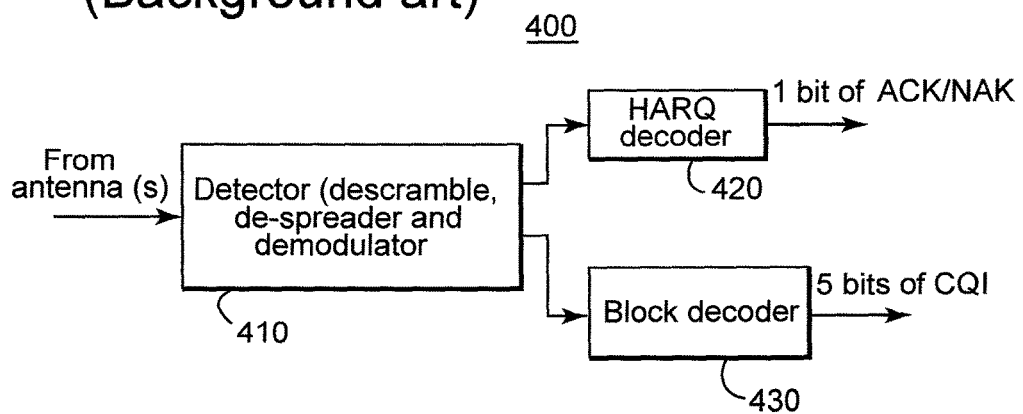
FIG. 4 is a block diagram of a conventional receiver.
Figure 6:
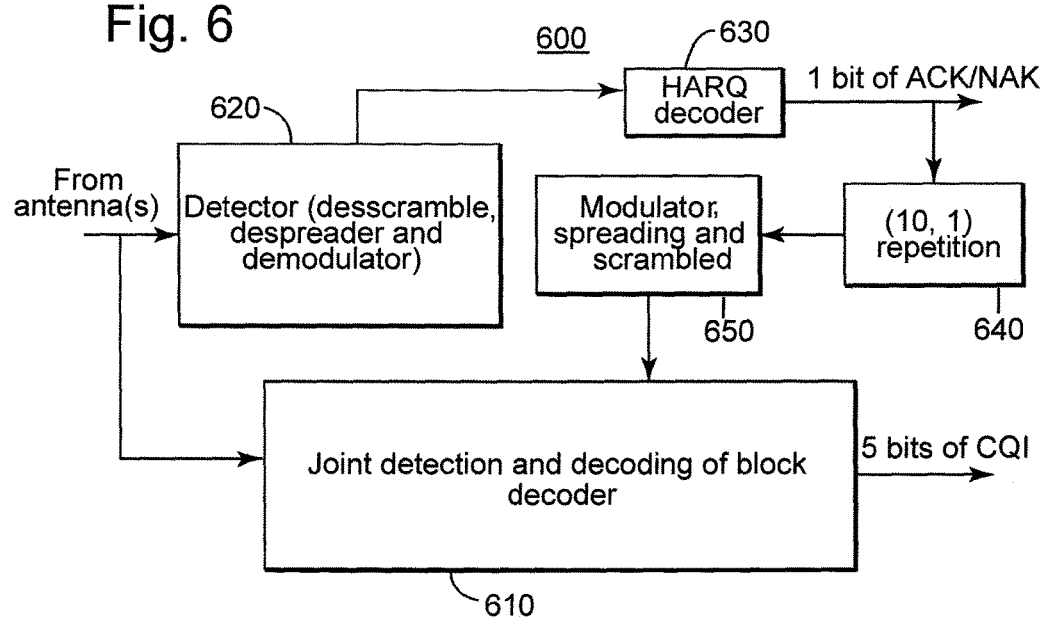
FIG. 6 is a block diagram of a receiver according to an embodiment.

A block diagram of a receiver 600 according to an embodiment is illustrated in FIG. 6. Receiver 600 includes module 610 configured to jointly detect and decode the CQI portion of the signal in FIG. 2. The manner in which module 610 performs joint detection and decoding is explained in more detail below. The signal received from one or more antennas is fed to module 610 and to a detector 620 which, similar to the conventional receiver, using any known detection method, descrambles, de-spreads and demodulates the received signal, to then feed a portion thereof to HARQ decoder 630, which retrieves the HARQ-ACK information. This information is then recoded in block 640, modulated, spread and scrambled in block 650 to be provided to module 610.

In view of the already detected part of the signal (e.g., the HARQ-ACK part), the received signal r can be written as $$r = \sqrt{P} \, (h_N \ h_{N-1} \ \ldots \ h_1) \begin{pmatrix} x_{2561-N+1} & x_{2561-N+2} & \cdots & x_{7680} \\ x_{2561-N+2} & x_{2561-N+3} & \cdots & 0 \\ \vdots & \vdots & \ddots & \\ x_{2561} & x_{2562} & \cdots & 0 \end{pmatrix} + n \quad (1)$$

where r is the vector of received symbols, P is the received power, N is the number of significant multipath taps, $h=(h_N \ h_{N-1} \ \ldots \ h_1)$ is the channel multipath vector, x is the transmission matrix corresponding to the significant among the 7680 chips (i.e., 5120=7680−2560=20×256, where 20 is the number of bits of coded CQI and 256 is the spread factor), and n is noise.

Figure 7:
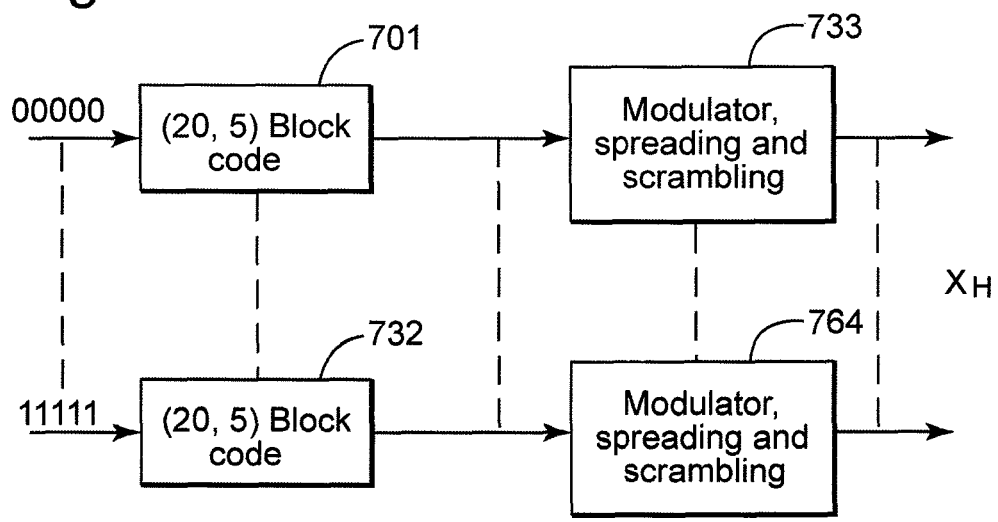
FIG. 7 is a block diagram illustrating the manner of generating transmission matrices according to an embodiment.

CQI's 5 bits of information can have $2^5=32$ values. For each of these possible CQI values, a hypothetical transmission matrix $X_H$ can be calculated as illustrated in the block diagram of FIG. 7. Each of the possible values (00000) to (11111) is first coded in blocks 701 to 732 to be then modulated, spread and scrambled in blocks 733-764, respectively. Blocks 733-764 output hypothetical transmission matrices $X_H$, where H=1÷32.

Using these hypothetical transmission matrices, noiseless signals are calculated as:

$$r_H = hX_H. \quad (2)$$

Differences between the received signal, which is altered by noise, and these noiseless signals (that are obtained using the hypothetical transmission matrices) are then calculated. The value, $X_s$, corresponding to the smallest difference is output as the actual part of signal:

$$X_s = \mathrm{argmin} \| r - hX_H \|^2. \quad (3)$$

Figure 8:
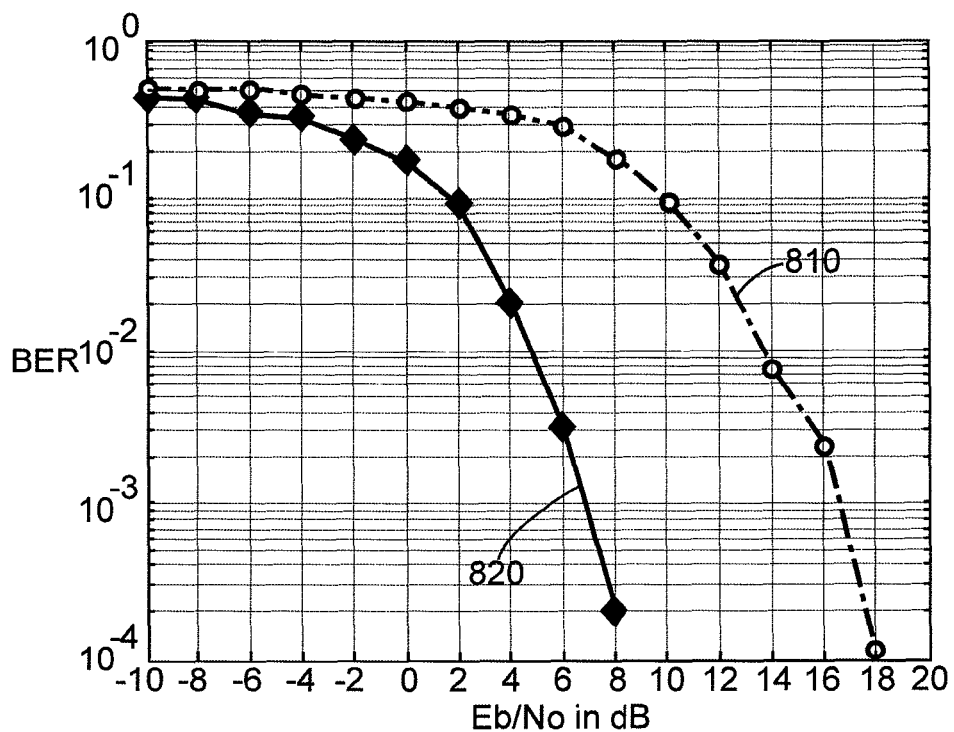
FIG. 8 is a graph of Bit-Error-Rate versus Signal-to-Noise ratio.
Figure 9:
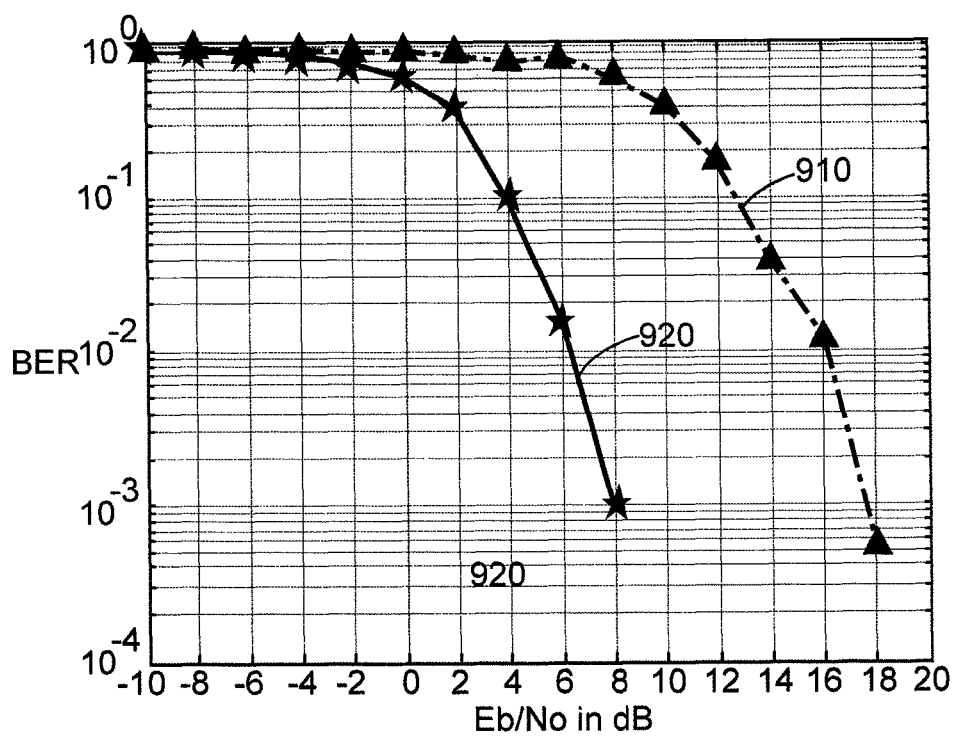
FIG. 9 is a graph of BLock-Error-Rate versus Signal-to-Noise ratio.

The receivers according to these embodiments have the advantage that the bit error rate (BER) and the block error rate (BLER) decrease for the same signal-to-noise ratio relative to the conventional receiver. FIG. 8 is a graph of BER (on y-axis, represented using a logarithmic scale) versus signal-to-noise ratio (on x-axis, in decibels, dB). Curve 810 in FIG. 8 corresponds to the conventional receiver, and curve 820 corresponds to a simulation of the receiver that jointly detects and decodes the CQI portion of the same control signal. FIG. 9 is a graph of BLER (on y-axis, represented using a logarithmic scale) versus signal-to-noise ratio (on x-axis, in decibels, dB). Curve 910 in FIG. 9 corresponds to the conventional receiver, and curve 920 corresponds to a simulation of the receiver that jointly detects and decodes the CQI portion of the same control signal. Both BER and BLER curves 820 and 920 corresponding to the receiver that jointly detects and decodes at least a part of the signal show improvement compared to curved 810 and 910 corresponding to the conventional receiver.

It may be known by the receiver (and the transmitter) that one of the 32 possible values is not used. For example, in 3GPP TS 25.214, it is specified that value "00000" is not used. In view of this knowledge, in one embodiment of the receiver, the hypothetical transport matrix, the noiseless signal and the difference corresponding to the unused value are not calculated.

Figure 10:
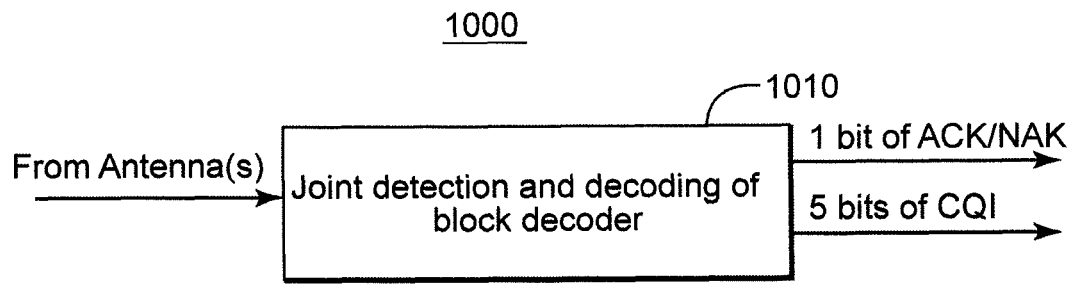
FIG. 10 is a block diagram of a receiver according to another embodiment.

According to another embodiment illustrated in FIG. 10, receiver 1000 is configured to jointly detect and decode (in block 1010) both the HARQ-ACK portion and the CQI portion of the signal. For this embodiment, the transport matrices are generated to also take into consideration values of HARQ-ACK's one bit, and the value that minimizes the difference between the received signal and the noiseless signal calculated using a transport matrix corresponds to an ACK/NAK bit and CQI 5-bit combination.

Figure 11:
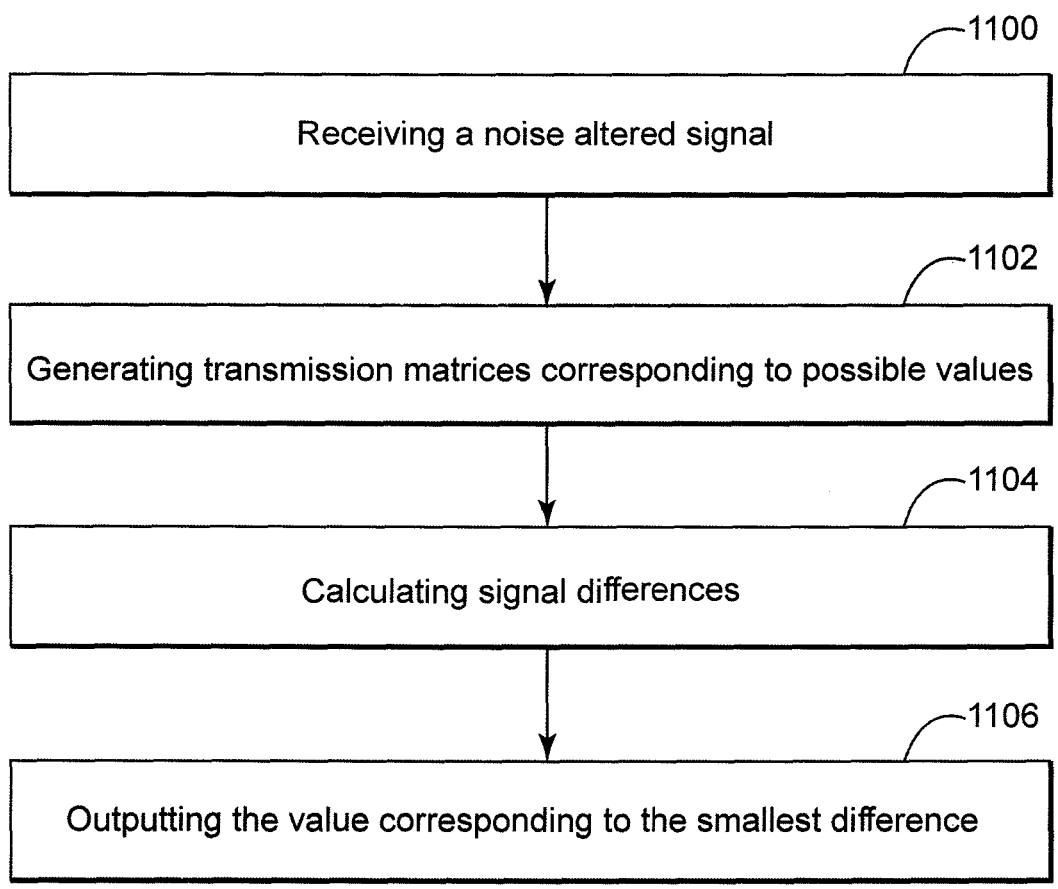
FIG. 11 is a flow diagram of a method according to an embodiment.

FIG. 11 is a flow diagram of a method for jointly detecting and decoding at least a part of a signal (or the whole signal), which is transmitted on a channel in a wireless communication network and is corrupted by multipath, according to an embodiment. The method includes, at 1100, receiving the noise-altered signal at a network device. The method further includes, at 1102, generating transmission matrices, each transmission matrix corresponding to one possible value of the part of the signal (or of the whole signal if it is the case). The method then includes, at 1104, calculating differences between the noise-altered signal and noiseless signals that are obtained using the transmission matrices and correspond to the possible values, respectively. At 1106, the method then includes outputting a value corresponding to the smallest among the calculated differences as the part of the signal (or the whole signal).

Figure 12:
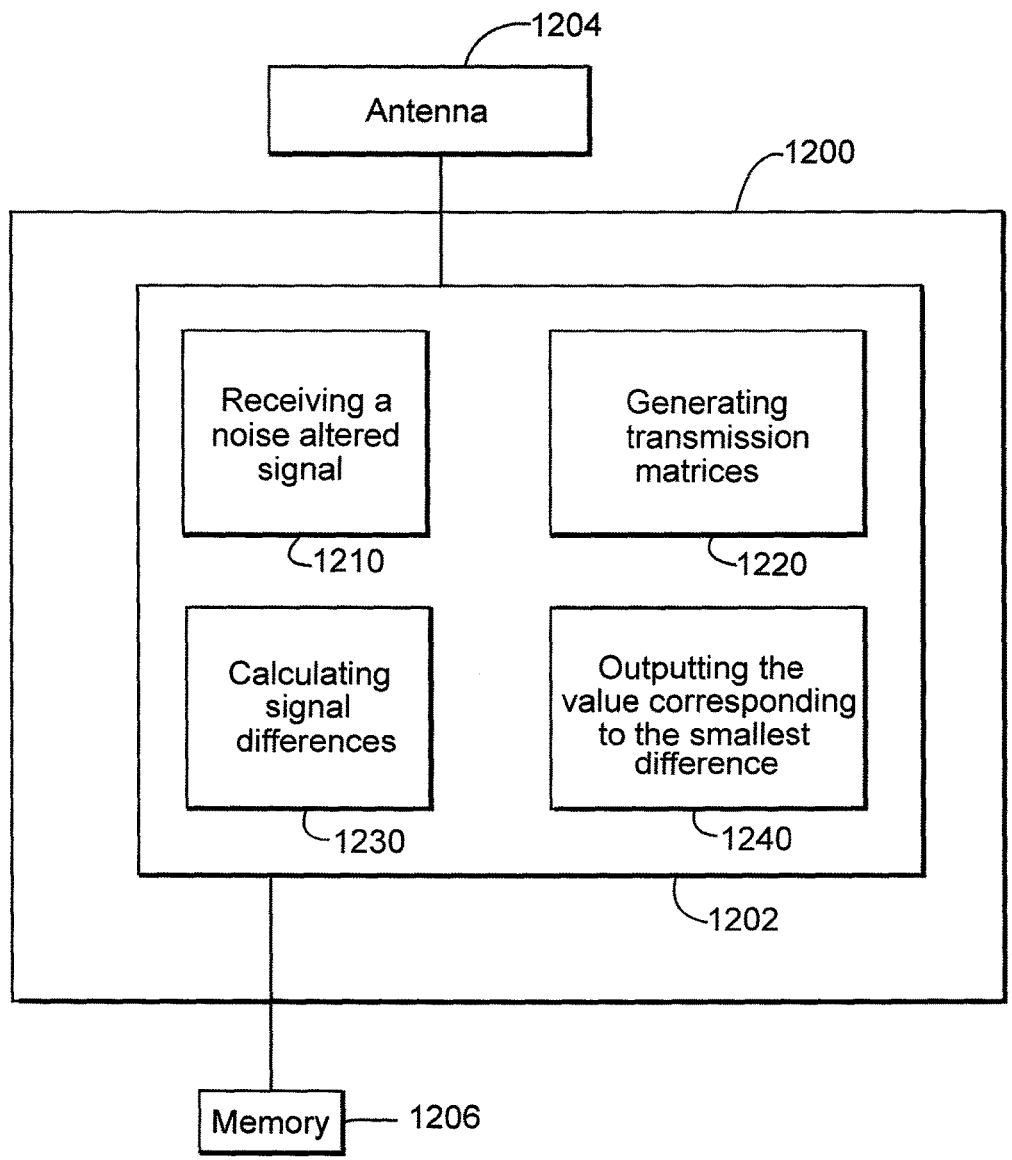
FIG. 12 is a block diagram of a receiver according to yet another embodiment.

A block diagram of a receiver 1200 configured to perform the method in FIG. 11 is illustrated in FIG. 12. Receiver 1200 includes a processing unit 1202 (having at least one processor) connected to one or more antenna(s) 1204. Processing unit 1202 may be connected to a memory 1206 configured to store computer-executable instructions. Processing unit 1202 includes a first module 1210 configured to receive a noise-altered signal from the antenna. Processing unit 1202 further includes a second module 1220 configured to generate transmission matrices corresponding to possible values of a part of the signal. Processing unit 1202 also includes a third module 1230 configured to calculate differences between the noise-altered signal and noiseless signals that are obtained using the transmission matrices and correspond to the possible values of the part of the signal, respectively. Processing unit 1202 also includes a fourth module 1240 configured to output the value that corresponds to the smallest among the calculated differences as the part of the signal. Modules 1210-1240 are implemented as hardware and/or software.

According to yet another embodiment, a computer readable medium (e.g., memory 1206) stores computer-executable instructions which, when executed by a computer (e.g., processing unit 1202), implement a method for jointly detecting and decoding at least a part of a signal transmitted using multipath in a wireless communication network. The method includes receiving the signal altered by noise at a network device, generating transmission matrices, each corresponding to one possible value of the part of the signal, and calculating differences between the signal altered by noise and noiseless signals that are obtained using the transmission matrices and correspond to the possible values of the part, respectively. The method further includes outputting a value corresponding to the smallest among the calculated differences as the part of the signal.

The disclosed embodiments provide the advantage of enhanced (optimal) receiver performance in terms of BLER and/or BER. The methods are easy to implement. Since errors in decoding CQI become less frequent than for the conventional methods (receivers), higher throughput and superior data transmission performance are achieved.

The disclosed embodiments methods and receivers that jointly detect and decode at least a part of a signal transmitted using multipath. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile disc (DVD), optical storage devices, or magnetic storage devices such a floppy disk or magnetic tape. Other non-limiting examples of computer-readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software or firmware tangibly embodied in a computer-readable storage medium for execution by a specifically programmed computer or processor.

What is claimed is:

1. A method for jointly detecting and decoding at least a part of a signal, which is transmitted on a channel in a wireless communication network and is corrupted by channel multipath, the method comprising:
   receiving the signal altered by noise at a network device, wherein the signal has been generated from a first part and a second part coded separately, combined, and then modulated, spread and scrambled before being transmitted;
   generating transmission matrices each corresponding to one of possible values of the part of the signal;
   calculating differences between the signal altered by noise and noiseless signals corresponding to the possible values of the part obtained using the transmission matrices, respectively; and
   outputting a value of among the possible values as the part of the signal, the value corresponding to the smallest among the calculated differences, wherein, for one of the possible values known as not being used both by a network device transmitting the signal and the network device receiving the signal, a corresponding transmission matrix is not generated, and a corresponding difference is not calculated.

2. The method of claim 1, wherein the signal is transmitted on a dedicated control channel.

3. The method of claim 1, wherein a network device transmitting the signal is a user equipment and the network device receiving the signal is a base station.

4. The method of claim 1, further comprising:
   detecting the first part from the received noise altered signal, and
   decoding the detected first part,
   wherein the detected and decoded first part is used to calculate the differences.

5. The method of claim 1, wherein the part of the signal includes both the first part and the second part.

6. The method of claim 1, wherein the network device is a base station, and the method further comprises:
   sending a pilot signal to a user equipment, UE, wherein
   the first part corresponds to one bit that indicates whether the UE has received a data signal, and
   the second part corresponds to five bits conveying a channel quality information derived by the UE upon receiving the pilot signal.

7. The method of claim 1, wherein the generating, calculating and the outputting are performed by a data processing unit including a processor.

8. A network device in a wireless communication network, comprising a receiver for jointly detecting and decoding at least a part of a signal transmitted using multipath, the receiver including:
   a processor configured to receive a noise altered signal, wherein the signal has been generated from a first part and a second part coded separately, combined, and then modulated, spread and scrambled before being transmitted;
   the processor configured to generate transmission matrices corresponding to possible values of the part of the signal;
   the processor configured to calculate differences between the noise altered signal and noiseless signals corresponding to the possible values of the part obtained using the transmission matrices, respectively; and
   the processor configured to output a value of among the possible values as the part of the signal, the value corresponding to the smallest among the calculated differences, wherein, for one of the possible values known as not being used both by a network device transmitting the signal and the network device receiving the signal, a corresponding transmission matrix is not generated, and a corresponding difference is not calculated.

9. The network device according to claim 8, wherein the processor receives the noise altered signal on a dedicated control channel.

10. The network device according to claim 8, wherein the second part of the signal is the part of the signal, the network device further comprising:
    the processor configured to detect the first part of the signal from the received noise altered signal, and
    the processor configured to decode the detected first part.

11. The network device according to claim 8, wherein the part of the signal includes both the first part and the second part.

12. The network device according to claim 8, wherein the network device is a base station and further comprises:
    the processor configured to send a pilot signal to a user equipment (UE), wherein
    the first part corresponds to one bit that indicates whether the UE has received a data signal, and
    the second part corresponds to five bits conveying a channel quality information derived by the UE upon receiving the pilot signal.

13. A non-transitory computer readable medium storing computer executable instructions, which, when executed by a computer, implement a method for jointly detecting and decoding at least a part of a signal transmitted using multipath in a wireless communication network, the method comprising:
    receiving a noise altered signal at a network device, wherein the signal has been generated from a first part and a second part coded separately, combined, and then modulated, spread and scrambled before being transmitted;
    generating transmission matrices each corresponding to one of possible values of the part of the signal;
    calculating differences between the noise altered signal and noiseless signals obtained using the transmission matrices and corresponding to the possible values of the part, respectively; and
    outputting a value of among the possible values as the part of the signal, the value corresponding to the smallest among the calculated differences, wherein, for one of the possible values known as not being used both by a network device transmitting the signal and the network device receiving the signal, a corresponding transmission matrix is not generated, and a corresponding difference is not calculated.

14. The non-transitory computer readable medium of claim of claim 13, wherein the method further comprises detecting the first part from the received noise altered signal, and decoding the detected first part.

15. The non-transitory computer readable medium of claim of claim 13, wherein the part of the signal includes both the first part and the second part.

\* \* \* \* \*